UNITED STATES PATENT OFFICE.

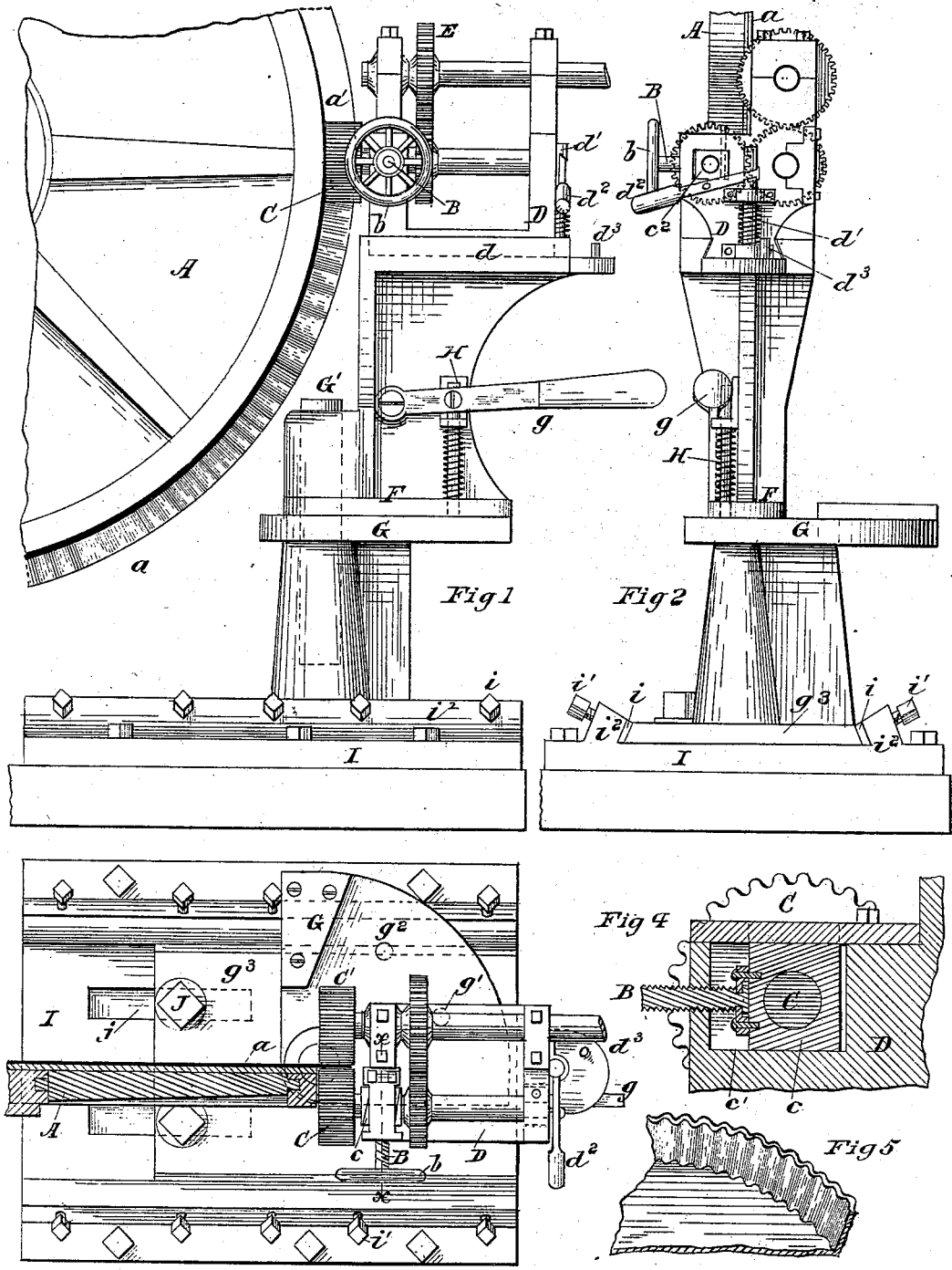

ISAAC VAN HAGEN, OF CHICAGO, ILLINOIS, ASSIGNOR TO THE ADAMS & WESTLAKE MANUFACTURING COMPANY, OF SAME PLACE.

SHEET-METAL-SHAPING MACHINE.

SPECIFICATION forming part of Letters Patent No. 253,326, dated February 7, 1882.

Application filed December 9, 1881. (No model.)

*To all whom it may concern:*

Be it known that I, ISAAC VAN HAGEN, a citizen of the United States, residing at Chicago, in the county of Cook and State of Illinois, have invented certain new and useful Improvements in Sheet-Metal-Shaping Machines, which are set forth in the following specification, reference being had to the accompanying drawings, in which—

Figure 1 is a side elevation of a machine embodying my improvements; Fig. 2, an end elevation of the same; Fig. 3, a plan of the same with the chuck in section; Fig. 4, a detail view, on an enlarged scale, of one of the rollers with its sliding bearing; and Fig. 5, a detail perspective view (broken away) of the blank when shaped by my machine.

My invention relates to a machine for crimping and flanging metal, and is especially intended for use in the manufacture of stove-board covers.

My invention consists of certain devices, hereinafter described and claimed, by means of which a circular piece of sheet metal placed on a chuck or face-plate may have its edge turned up and crimped.

In the drawings, A represents a wheel which, from the analogy in the use to which it is put in my apparatus, I shall term a "chuck" or "face-plate." On this chuck is secured concentrically a circular blank of sheet metal, $a$. Preferably this blank is beaded in any well-known way at the vertex of the angle of the flange, the turning of which is hereinafter to be described.

B is a screw-shaft, which is operated by the hand-wheel $b$ to slide the journal-box $c$ of the shaft of the roller C on its ways $c'$ away from the stationary roller C′, said shaft being mounted at its other end in a vertically-pivoted journal-box, $c^2$. This is in order to admit the edge of the blank between said rollers as it is placed on the chuck; and when the blank is thus adjusted the roller C is screwed back until the edge of the blank is firmly griped and sunk in the corrugations of the rollers. I have provided a spur-wheel, E, operated by a crank or by a belt from a counter-shaft above, and meshing with a pinion on the shaft of the stationary roller C′ for communicating power to the rollers which revolve the sheet metal, and the chuck thereby, while shaping the blank. When the rollers, which are made corrugated, as shown, so as to operate as crimpers, as well as flangers, and thus take up the sheet metal of the edge which become superfluous on reducing the diameter of the blank by flanging it, have been made to embrace the edge of the sheet metal rotary motion is communicated to them, while at the same time the operator begins to rotate the roller-frame D, together with its bed-piece F, on a turn-table, G, by means of the handle $g$. This bed-piece swings on a pivot, G′, the center line of which is tangent to the edge of the face of the chuck. The bed-piece F is swung around through a small arc to a hole, $g'$, in the turn-table, into which hole the pin H is sprung. At the same time with the swinging of the bed-piece power is applied to rotate the rollers, which continue their revolution during a complete revolution of the chuck after the engagement of the spring-pin H. The chuck is now stopped and the bed-piece is swung around through another small arc, when the pin H enters the hole $g^2$ in the turn-table, and the rollers and chuck are again made to rotate, and this rotation is continued until after the chuck has made a complete revolution while the pin H is in the hole $g^2$. By these adjustments of the bed-piece and the corrugations of the rollers a crimped flange is made. The pin $d'$ is now released by depressing its handle $d^2$, and the roller-frame is made to slide away in its dove-tailed slide $d$ from the sheet metal to the stop $d^3$, when which stop is reached the rollers will clear the blank on the return of the bed-piece F—the pin H having been released by raising the handle $g$—to its original position, where the machine, on sliding back the frame D until the pin $d'$ enters its hole, will be ready for a repetition of the operation on a new piece of sheet metal.

The turn-table G is itself arranged to slide longitudinally on the bed-plate I toward and away from the chuck-spindle, to accommodate itself to sheet-metal blanks of different diameters, between ridges $i^2$, between which it is adjusted laterally by means of gibs $i$ and set-screws $i'$ in the usual way.

For the purpose of securing the turn-table G down on the bed-plate I, the screw-bolts J are provided, the shanks of which between the head and the nut pass through holes in the base $g^3$ of the turn-table and plate $j$ in the bed-plate I. These holes and slots are of course made narrow enough to prevent the passage through them of the bolt-head, (or nut, as the case may be;) but at the same time the holes or slots, or both, are made to fit the bolts somewhat loosely, in order to admit of the slight lateral adjustment, to effect which the set-screws $i'$ and gibs $i$ are provided. By this construction I am enabled to adjust the turn-table either laterally or longitudinally without removing the screw-bolts by slightly loosening their nuts, and am enabled to make a greater number of different adjustments than would be possible with the use of a series of bolt-holes in the bed-plate I.

The pivot G' is made tangent, as described, for obvious reasons, as otherwise the rollers would collide with or be drawn away from the chuck, in the latter case either leaving the blank or causing that to leave the chuck, and thus lose its support.

Having thus described my invention, what I claim as new, and desire to secure by Letters Patent, is—

1. In a sheet-metal-shaping machine, a pair of rollers, C C', and a rotary chuck, combined and operating substantially as set forth.

2. In a sheet-metal-shaping machine, a pair of rollers, C C', a rotary chuck, and rotary bed-piece F, combined and operating substantially as set forth.

3. In a sheet-metal-shaping machine, a pair of rollers, C C', a rotary chuck, and sliding frame D, combined and operating substantially as set forth.

4. In a sheet-metal-shaping machine, a pair of rollers, C C', a rotary chuck, sliding frame D, and rotary bed-piece F, combined and operating substantially as set forth.

ISAAC VAN HAGEN.

Witnesses:
 JNO. C. MACGREGOR,
 M. B. GAGE.